(No Model.) 4 Sheets—Sheet 3.
E. H. AMET.
AUTOMATIC SCALES FOR WEIGHING RAILROAD CARS AND RECORDING THE WEIGHT THEREOF.
No. 413,880. Patented Oct. 29, 1889.
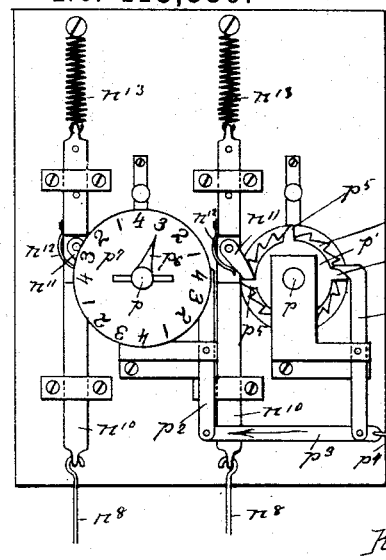
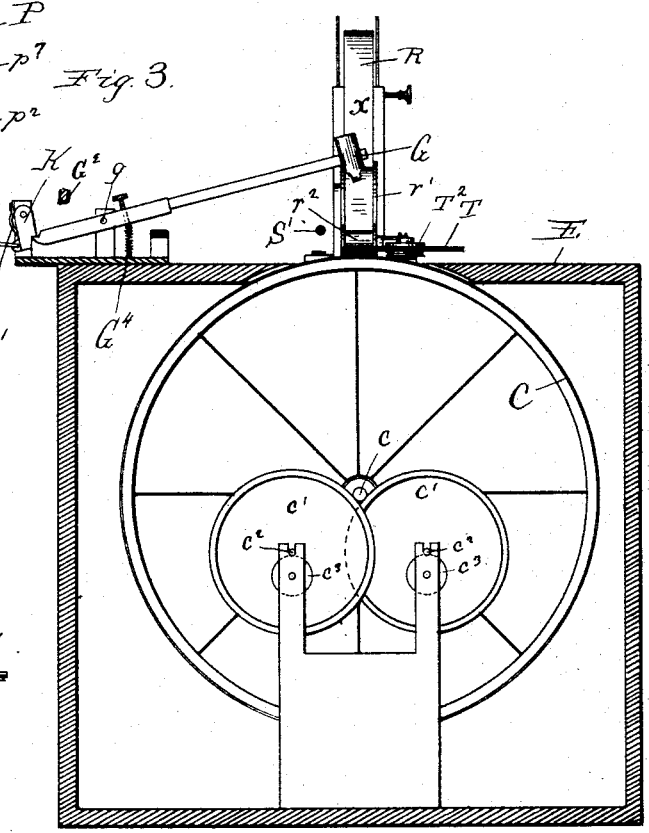
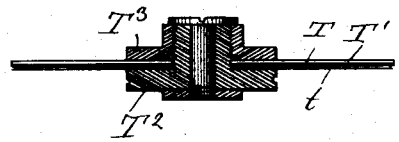
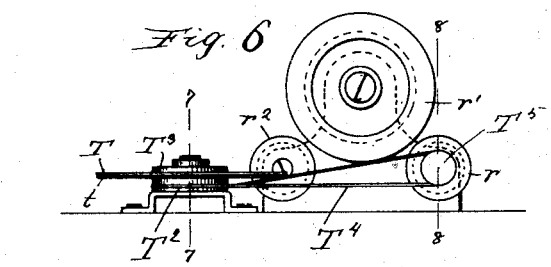
Witnesses:
Lew. E. Curtis.
H. W. Munday
Inventor:
Edward H. Amet,
By Munday, Evarts & Adcock
His Attorneys.

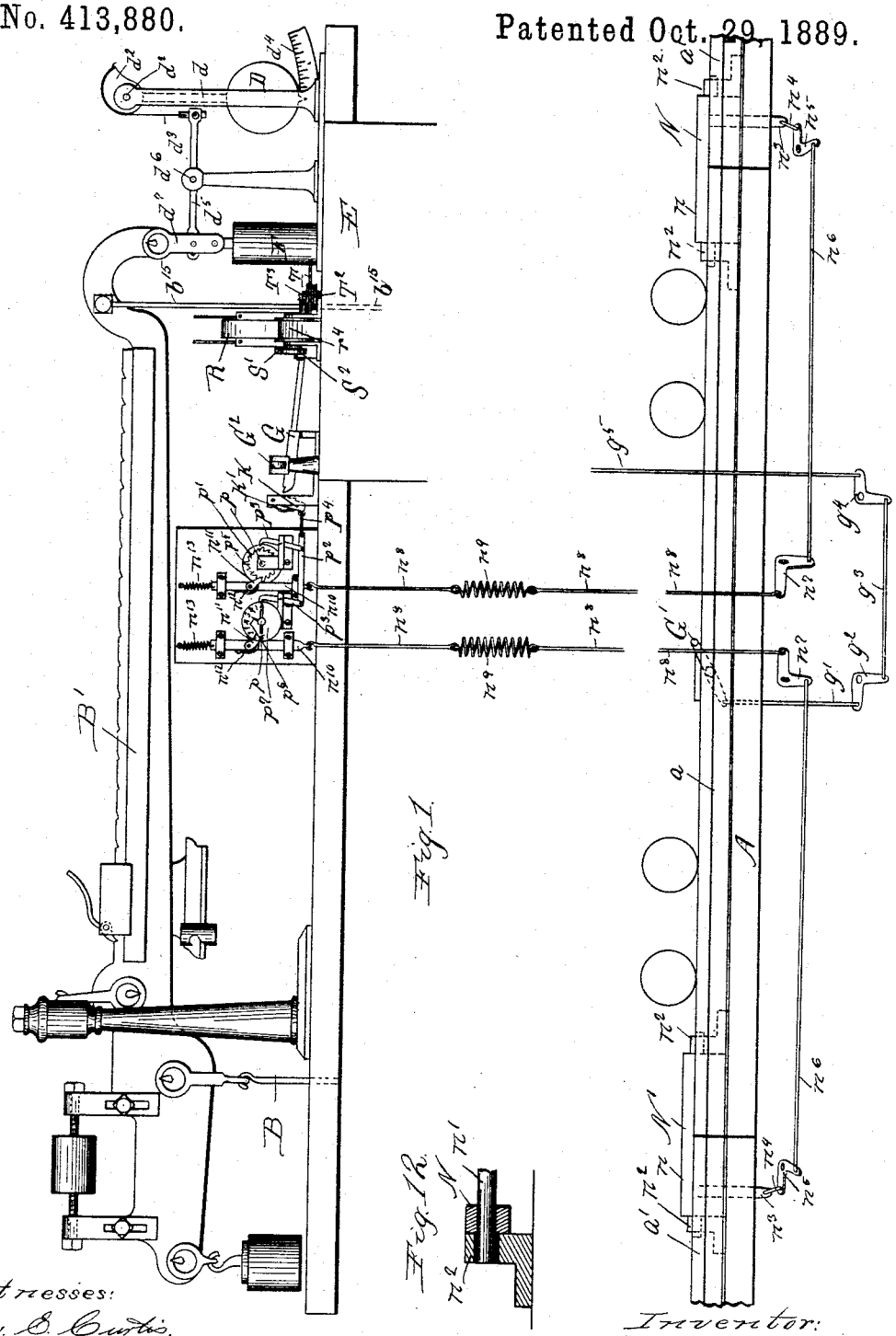

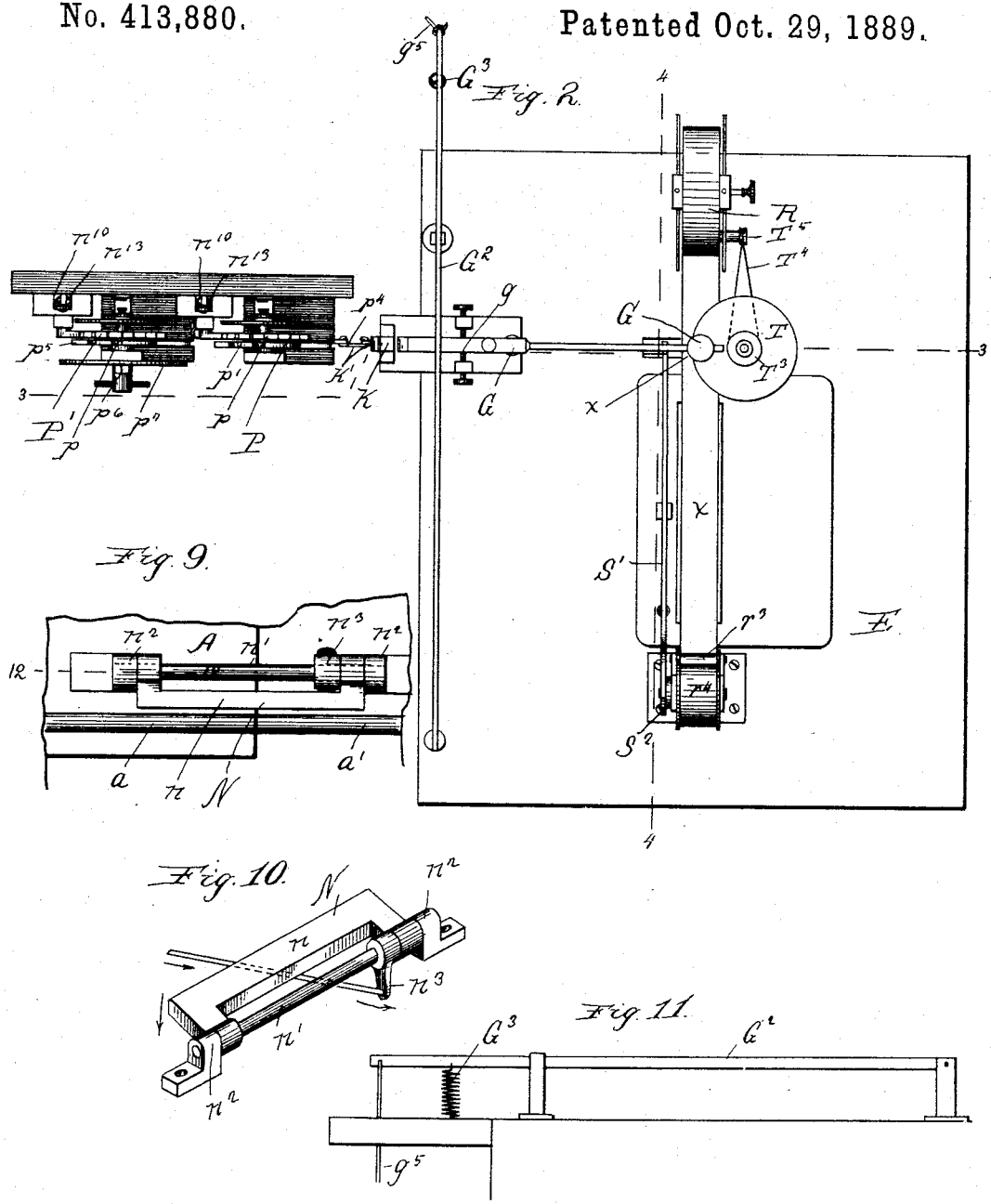

(No Model.) 4 Sheets—Sheet 4.
E. H. AMET.
AUTOMATIC SCALES FOR WEIGHING RAILROAD CARS AND RECORDING THE WEIGHT THEREOF.
No. 413,880. Patented Oct. 29, 1889.
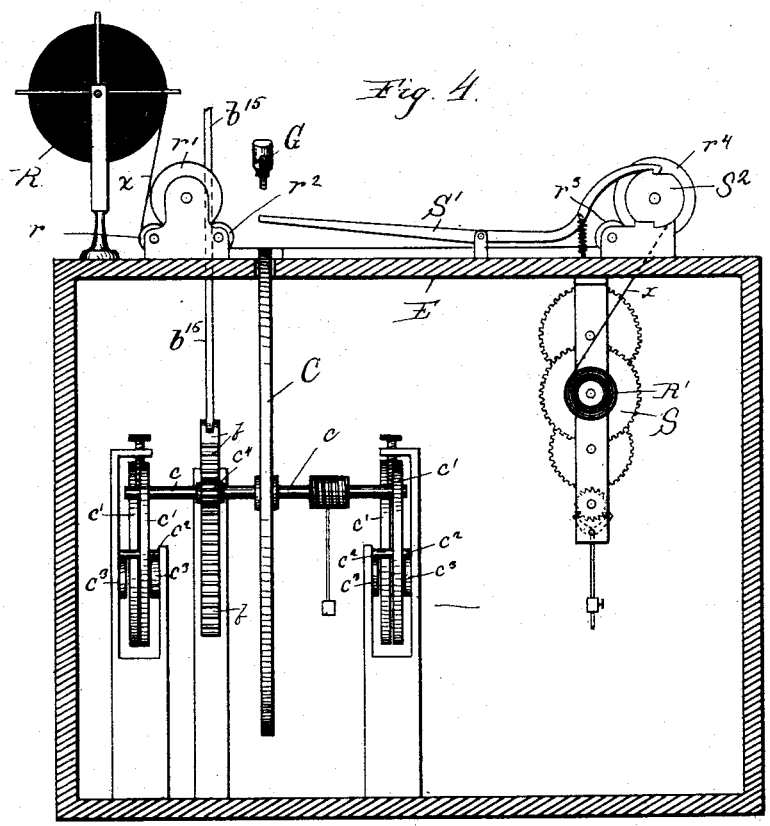
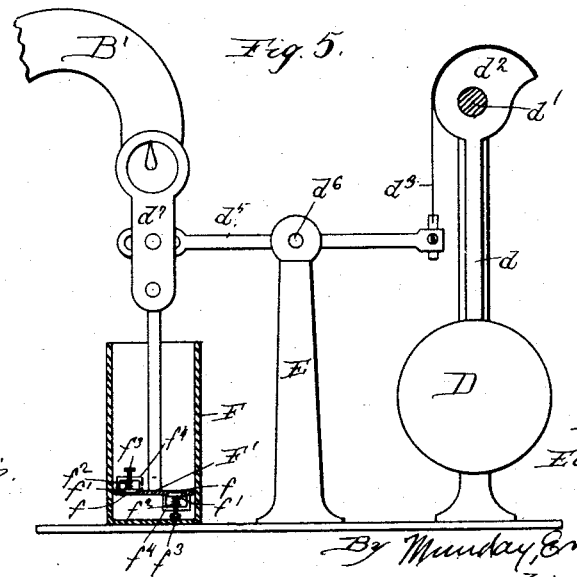
Witnesses:
Lew. E. Curtis.
H. M. Munday
Inventor:
Edward H. Amet
By Munday, Evarts & Adcock
his Attorneys

UNITED STATES PATENT OFFICE.

EDWARD H. AMET, OF CHICAGO, ILLINOIS, ASSIGNOR TO HERBERT A. STREETER, OF SAME PLACE.

AUTOMATIC SCALE FOR WEIGHING RAILROAD-CARS AND RECORDING THE WEIGHT THEREOF.

SPECIFICATION forming part of Letters Patent No. 413,880, dated October 29, 1889.

Application filed January 28, 1889. Serial No. 297,750. (No model.)

*To all whom it may concern:*

Be it known that I, EDWARD H. AMET, a citizen of the United States, residing in Chicago, in the county of Cook and State of Illinois, have invented a new and useful Improvement in Automatic Scales for Weighing Railroad-Cars and Recording the Weights thereof, of which the following is a specification.

My invention relates to automatic scales for weighing railroad-cars and printing the weights thereof.

The invention is designed to automatically weigh and record the weights of the several cars coupled in a train without stopping the train, the weighing and recording the weight of each car being done while the car coupled in the train is drawn over the scale-platform at a reasonable speed, so that a whole train of cars may be weighed very quickly and easily. As the cars in a train ordinarily vary materially in length, provision is made by my invention to weigh with equal facility short or long cars.

My invention relates more particularly to certain improvements upon the car-scales heretofore patented by me in Letters Patent Nos. 317,432, 380,672, and 392,531.

The present invention consists in the novel devices and novel combinations of parts and devices herein shown and described, and more particularly pointed out in the claims.

In the accompanying drawings, which form a part of this specification, and in which similar letters of reference indicate like parts, Figure 1 is a side elevation or diagram view of a device embodying my invention. Fig. 2 is a partial plan view. Figs. 3 and 4 are sections on lines 3 3 and 4 4 of Fig. 2, respectively. Fig. 5 is an enlarged sectional view of the dash-pot, which is connected to the scale beam or lever, and showing also the variable counterpoise. Fig. 6 is an enlarged detail view of the paper-feed rolls and rubber disk carrying the carbon-paper. Figs. 7 and 8 are enlarged detail sections taken on lines 7 7 and 8 8, respectively, of Fig. 6. Figs. 9 and 10 are enlarged detail views of one of the levers adjacent to the track-rail, so as to be operated by the car-wheels as they pass along on the road. Fig. 11 is a detail elevation of the lever which raises the impression hammer or block, and Fig. 12 is a section on line 12 12 of Fig. 9.

In said drawings, A represents a scale-platform having railroad-track rails $a$ thereon, which connect with the rails $a'$ of the track leading to the scale.

B is the connection from the scale-platform, and B' is the scale-beam. The scale, its platform, and beam are or may be of any suitable construction known to those skilled in the art or now commonly in use, and of course need no detailed illustration or description.

C is the type-wheel, the axle or shaft $c$ of which is journaled on friction-wheels $c'$, the shafts $c^2$ of which are journaled upon friction-wheels $c^3$ to still further diminish the friction. The shaft $c$ is furnished with a gear $c^4$, which meshes with a rack $b$, connected by a pivoted link $b^{15}$ with the scale-beam B' or other moving part or lever of the scale, so that the movement of the scale-platform will turn the type-wheel.

The scale-beam B' is connected to a variable counterpoise D. This variable counterpoise I have heretofore usually made of a coil-spring, as shown and described in my patents before referred to. I find, however, in practice that the tension of the coil-spring is subject to more or less variation, and to prevent the errors incident thereto I prefer to employ a variable counterpoise consisting of a pendulum-balance. The pendulum-balance D has a rigid arm $d$, pivoted at $d'$ to the frame E. The upper or short end of the arm $d$ terminates in an eccentric arc-shaped head $d^2$, to which is secured a flexible band $d^3$, preferably a thin flat steel band. The curve of this eccentric is such as to give equal or approximately equal steps to the index-scale $d^4$ and to the type-wheel C. The motion of the counterpoise D is communicated to the type-wheel through the eccentric arc-shaped head $d^2$, strap $d^3$, lever $d^5$, link $d^7$, scale-beam B', and rack $b$, connected to the scale-beam, which rack meshes with the gear $c^4$ on the shaft of the type-wheel, the counterpoise D being of course raised or moved by the weight on the scale-platform. The flexible band or strip $d^3$ is connected to the scale-beam B', preferably through an intermediate lever $d^5$, pivoted at $d^6$ to the frame E. The lever $d^5$ is connected to the beam by the pivotal link $d^7$. I prefer to connect the variable counterpoise to the long end of the scale-beam, as shown.

F is a dash-pot, vessel, or cylinder, and F' is the disk or piston which moves therein to steady the movement of the scale-beam and of the type-wheel, which is operated therefrom. The disk or piston F' has two ports $f$ $f$, furnished with valves $f'$ $f'$, one opening up and the other down, and which are held close by springs $f^2 f^2$, so that when the piston is moving either up or down one of these valves may open more or less against its spring, and thus diminish the resistance of the dash-pot when the scale-beam is moving quickly. By thus combining a dash-pot having spring-closed ports in its piston with the scale or scale-beam I cause the scale-beam to move steadily, and at the same time come to a true balance very quickly, both of which results are very important in order to produce a successful and practical scale for automatically weighing cars while moving in a train over the scale-platform. The tension of the springs $f^2$ is regulated by set-screws $f^3$, threaded in the brackets $f^4$.

G is the impression block or lever, pivoted at $g$ to the frame E, by which the type-wheel C is made to print the weight of each car upon the paper strip $x$ after the scale-beam reaches the true balance and turns the type-wheel to the proper point to indicate or print the weight of the car. This impression lever or block is raised by a car-wheel-operated lever G', located near the middle of the scale-platform, adjacent to one of the rails $a$ thereon, so that the wheel of the car will depress or operate the lever as it passes along. The car-wheel-operated lever G' communicates motion to the impression-lever G through any suitable connecting mechanism—as, for example, a link $g'$, bent lever $g^2$, link $g^3$, bent lever $g^4$, link $g^5$, and lever $G^2$. The lever $G^2$ (see Fig. 11) is provided with a spring $G^3$ to move it back out of the way of the impression-lever G as soon as the car-wheel passes off of the lever G'. The impression-lever G is held in its retracted or elevated position by a trigger or pawl K. The pawl K is pivoted to the frame E and is held in place by a spring K'. A spring $G^4$ actuates the impression lever or block to make the impression the moment the trigger or pawl K is moved to release said impression-lever. The pawl K is operated at the proper moment to release the impression-lever G by means of devices N N', located at each end of the scale-platform adjacent to one of the rails $a$, so that said devices or levers are depressed or actuated by the wheels of the car as it passes along. The levers or devices N N' are so located or so constructed or arranged that if the car is a long one the front wheel of the car may give the necessary final impulse to the lever N' at the exit end of the scale-platform before passing off the same, while if the car on the platform happens to be a very short one the front wheel of the next succeeding car will give the necessary final impulse to the lever N at the entry end of the scale-platform before the front wheel of such succeeding car passes onto the platform. By this means I am enabled to weigh with equal facility long or short cars coupled in a moving train, and whether the cars approach the scale-platform from one direction or the other.

The car-wheel-operated devices or levers N N' may be of any suitable form or construction and arranged in any suitable manner embodying the principle or mode of operation above described. A variety of different forms of construction which may readily occur to those skilled in the art may be employed. I prefer, however, to make the levers N N' of a long bail shape and to mount or pivot them so that one part of the lever will project on the scale-platform and the other part on the track beyond the scale-platform, such as shown in Figs. 1, 9, and 10. The long bar portion $n$ of the lever N' is thus adapted to be depressed by the front wheel of a long car on the scale-platform, or the front wheel of the next succeeding car, which is just approaching the scale-platform, may strike the similar long bar $n$ of the bail-shaped lever N at the other end of the scale-platform. The shaft or pivot $n'$ of each of the bail-levers N N' is mounted in loose or open bearings $n^2$, so that when the bail-lever is depressed by a wheel on the scale-platform the end or portion of the lever which is mounted on the rigid frame-work or track outside of the scale-platform will sustain no part of the weight of the car. No error in the weight will thus be occasioned by the fact that one end or part of the bail-lever N or N' is mounted or supported outside of the scale-platform, which I deem to be the preferable way of mounting or pivoting the bail-levers N N'. Each lever N N' has a short arm $n^3$, which is connected by any suitable intermediate mechanism with the ratchet or count wheels P P', (see Fig. 3,) the shafts $p$ $p$ of which carry cam-wheels $p'$, which actuate the impression-lever, releasing pawl or trigger K. The pawl K is actuated at the proper time by the cam-wheels $p'$ $p'$, through the levers $p^2$ $p^2$, connecting-bar $p^3$, and link $p^4$, which is pivoted to the pawl K.

The mechanism for communicating motion from the short arms $n^3$ of the bail-levers N N' to the ratchet or count wheels may preferably consist of links $n^4$, bent levers $n^5$, links $n^6$, bent levers $n^7$, links $n^8$, furnished with coil-springs $n^9$, and slides $n^{10}$, carrying pawls $n''$, which engage the teeth of the ratchet or count wheels P P'. Springs $n^{12}$ serve to keep the pawls $n^{11}$ in place, and springs $n^{13}$ serve to retract the slides $n^{10}$, and thus raise the bail-levers N N' after each impulse imparted thereto by the passage of the succeeding wheels of the cars. The springs $n^9$ serve to prevent any excessive strain being put upon the mechanism by the car-wheel-operated levers N N.' The cam-wheels $p'$ are furnished with a projection or cam $p^5$, one for each four teeth of the ratchet-wheels P P', so that the pawl K will be moved at each fourth impulse of the levers N N', the apparatus being designed for weighing cars having four wheels on a side or running on each rail. Each of the shafts $p$ is furnished with a pointer $p^6$, which indicates on a dial $p^7$ the position of the tripping cams or projections $p^5$ in relation to the ratchet or count wheels P P' and to the number of wheels of the car that have passed over the scale-platform. These pointers and dials are a matter of convenience in setting the apparatus so that the cam $p^5$ will release the impression-hammer at the proper time, especially as the number of wheels on the locomotive and tender is usually different from the number of wheels on a car. After the locomotive which pulls the train of cars to be weighed and its tender have passed over the scale-platform the pointers $p^6$ should both be set at No. 3, or so that one of the cams $p^5$ will operate the levers $p^2$ at the next or first impulse imparted to each of the levers N N' by the front wheel of the first car. The front wheel of the first car when it strikes the lever N at the entry end of the scale-platform will thus release the impression-lever and print a blank or zero weight before any of the wheels of the car get onto the scale-platform. The front wheel of the car as it advances to the middle of the scale-platform will then again raise the impression-lever by operating the lever G'. After the remaining three wheels of the car pass onto the scale-platform the ratchet-wheel P, which is operated by the lever N at the entry end of the scale-platform, will have been turned the distance of three teeth, and consequently be in position to release the impression-lever at the next impulse which it may receive. Now, if the car happens to be a short one, its front end will not strike the lever N' at the exit end of the scale-platform until after the front wheel of the succeeding car strikes and again operates the lever N, and thus releases the impression-lever and prints the weight of the car, and when the front wheel strikes the lever N', as the now-weighted car is passing off, it will of course turn the ratchet-wheel P', with which it is connected, into position to move the pawl K and release the impression-hammer; but the printing will not be repeated, because the impression-lever is already down and will not be again raised until one of the hind wheels of the car reaches the middle of the platform and strikes against the lever G', which, through its connections, operates to raise the impression-lever. If, however, the car happens to be a long one, the front wheel of the car will strike the lever N', and thus give the necessary final impulse to release the impression-lever, and so when the front wheel of the succeeding car strikes the lever N it will of course turn the ratchet and cam wheels into position for releasing the impression-lever; but the printing will not be repeated, because the impression-lever is at this time already down and has not yet been again raised by the passage of any of the wheels over the lever G' at the middle of the scale-platform. The impression-lever G, it will thus be seen, is combined with and operated by either one of the car-wheel-actuated levers N N', according as the car happens to be a long or a short one.

The intermediate connecting mechanism by which the motion is communicated to the impression-lever or its releasing-pawl from the levers N N' may be greatly varied by skilled mechanics without departing from the principle of my invention; and I desire it to be distinctly understood that my invention is not limited to any particular form of such connecting mechanism. That, however, which I have above described and shown in the drawings is the form of connecting mechanism which I prefer to employ, and which I believe to be the best now known to me for practicing my invention.

The paper strip $x$ is wound upon a supply spool or reel R, and passes around or over the tension and guide pulleys $r$ $r'$ $r^2$ $r^3$ $r^4$ to the receiving reel or spool R'.

S represents a clock-work or spring-motor for driving the receiving-spool R', and thus causing the paper strip $x$ to feed forward. The movement of the paper strip is regulated by a pawl-lever S', operated at intervals by the impression-lever G, and which engages a ratchet-wheel $S^2$ on the paper-guide pulley $r^4$. By this means the paper strip is automatically fed forward the space necessary to receive the next impression.

The impression of the type upon the paper strip may be simply an embossed or indented impression produced by the direct action of the impression lever or block upon the type-wheel; but the more improved means which I have devised for this purpose consist of a revolving elastic disk T, preferably of rubber, carrying on its under face a carbon-paper $t$. The rubber disk T is stiffened by a card-board disk T', the thin disks being placed together and clamped between the pulley $T^2$ and the screw-threaded nut or washer $T^3$. The pulley $T^2$ is slowly revolved, so as to continually present a new carbon surface to the type, by means of a band $T^4$, driven by a pulley $T^5$, secured on the shaft of the guide-roller $r$. (See Fig. 6.) The rubber or elastic disk T serves also to cushion the blow of the impression lever or hammer against the type-wheel. The feed of the paper strip $x$ and the revolution of the disk T are thus automatically effected by the car-wheel-operated levers on the scale-platform through the impression-lever G and the connecting mechanism before described. The disk T, interposed between the type-wheel and impression-lever, it will be observed, only bears against the type at the instant the blow is struck by the impression-lever, so that it can occasion no friction or error in weight by such contact with the type-wheel.

I claim—

1. The combination of a car-scale platform with levers N N' at the end of the scale-platform, and spanning a portion of the scale-platform and a portion of the track outside of the platform, whereby one or the other of said levers may be operated by the front wheel of the car on the platform or by the front wheel of the succeeding car, according as the car is a long or short one, substantially as specified.

2. The combination of a car-scale platform with levers N N' at the end of the scale-platform and spanning a portion of the scale-platform and a portion of the track outside of the platform, whereby one or the other of said levers may be operated by the front wheel of the car on the platform or by the front wheel of the succeeding car, according as the car is a long or short one, and a pair of ratchet or count wheels P P', connected with and operated by said levers N N', substantially as specified.

3. The combination, in an automatic car-scale with a printing-wheel connected with and actuated by the scale, of an impression-lever, and a pair of car-wheel-operated levers N N' at the ends of the scale-platform and spanning a portion of the scale-platform and a portion of the track outside of the platform, whereby one or the other of said levers may be operated by the front wheel of the car on the platform or by the front wheel of the succeeding car, according as the car is a long or short one, substantially as specified.

4. The combination of car-scale platform A with levers N N', spanning a portion of said platform and of the track outside of the platform, ratchet or count wheels P P', pawl K, impression-lever G, and type-wheel C, connected with and actuated by the scale, substantially as specified.

5. The combination, with the scale-beam, of a variable counterpoise consisting of a pendulum-balance and a printing-wheel connected with and operated by the movement of the scale-beam, substantially as specified.

6. The combination, in a car-scale for weighing cars in motion, of a scale-platform having track-rails thereon with a scale-beam and a dash-pot having a piston furnished with a yielding valve, so that the valve may open when the beam moves quickly, substantially as specified.

7. The combination, in a car-scale for weighing cars in motion, of a scale-platform having track-rails thereon with a scale-beam and a dash-pot having a piston furnished with two yielding valves, one opening up and the other down, substantially as specified.

8. The combination, with scale-beam B', of a variable counterpoise, a type-wheel, and a dash-pot having a piston furnished with spring-valve, and a scale-platform having track-rails thereon, substantially as specified.

9. The combination, with scale-beam B', of a variable counterpoise, a type-wheel, and a dash-pot having a piston furnished with two spring-closed ports, one opening up and the other down, and a scale-platform having track-rails thereon, substantially as specified.

10. The combination, with scale-beam B', of type-wheel C and variable counterpoise D, consisting of a pendulum-balance having an arm $d$, furnished with an eccentric arc-shaped head $d^2$, and flexible band $d^3$, for connecting said pendulum-balance and said beam, substantially as specified.

11. The combination, with scale-beam B', of type-wheel C and variable counterpoise D, consisting of a pendulum-balance having an arm $d$, furnished with an eccentric arc-shaped head $d^2$, and flexible band $d^3$, for connecting said pendulum-balance and said beam, and intermediate lever $d^5$, substantially as specified.

12. The combination, with scale-beam B', of type-wheel C and variable counterpoise D, consisting of a pendulum-balance having an arm $d$, furnished with an eccentric arc-shaped head $d^2$, flexible band $d^3$, for connecting said pendulum-balance and said beam, and a dash-pot having piston connected with said beam, substantially as specified.

13. The combination, in an automatic-printing weighing-scale, with a scale-beam, of a type-wheel connected therewith, and impression lever or block and disk T, carrying a carbon-paper, substantially as specified.

14. The combination, in an automatic-printing weighing-scale, with a scale-beam, of a type-wheel connected therewith, an impression lever or block, and a carbon-paper-carrying disk T, and means for revolving said disk, substantially as specified.

15. The combination, in an automatic-print ing weighing-scale, with a scale-beam, of a type-wheel connected therewith, an impression lever or block, and disk T, consisting of rubber and carrying a carbon-paper, substantially as specified.

16. The combination, in an automatic-printing weighing-scale, with a scale-beam, of the type-wheel connected therewith, and impression lever or block, and a movable elastic disk T, interposed between said impression-lever and type-wheels, substantially as specified.

17. The combination, with a scale-beam, of the type-wheel connected therewith, an impression lever or block, and a movable elastic disk T, interposed between said impression-lever and type-wheel, and a carbon-paper $t$, carried by said movable disk T, substantially as specified.

18. The combination, with a scale, of a variable counterpoise, a type-wheel C, rack-bar $b$, gears $c'$, dash-pot F and its piston F', having a spring-closed port, and a scale-platform having track-rails thereon, substantially as specified.

19. The combination, with the scale-platform A, having track-rails $a$ thereon, of the track $a'$, leading to the scale-platform, and the bail-shaped levers N N', extending partly on the scale-platform and partly on the track, substantially as specified.

20. The combination, with an automatic-printing weighing-scale having a platform A, furnished with track-rails $a$, of the lever N, extending partly on the scale-platform and partly on the track beyond the scale-platform, substantially as specified.

21. The combination, with an automatic-printing weighing-scale having a platform A, furnished with track-rails $a$, of the lever N, extending partly on the scale-platform and partly on the track beyond the scale-platform, and a similar lever N' at the other end of the scale-platform, substantially as specified.

22. The combination of the scale-platform A with a scale-beam, a variable counterpoise, a type-wheel, an impression lever or block, and the car-wheel-operated levers N N', extending partly on the scale-platform and partly on the track leading thereto, substantially as specified.

23. The combination of the scale-platform A with a scale-beam, a variable counterpoise, a type-wheel, an impression lever or block, and the car-wheel-operated levers N N', extending partly on the scale-platform and partly on the track leading thereto, a pawl K for holding said impression-lever raised, said car-wheel-operated levers N N' operating to release said pawl, substantially as specified.

24. The combination of scale-platform A with a scale-beam, a variable counterpoise, a type-wheel, an impression lever or block, and the car-wheel-operated levers N N', extending partly on the scale-platform and partly on the track leading thereto, a pawl K for holding said impression-levers raised, said car-wheel-operated levers N N' operating to release said pawl, mechanism connecting said levers N N' and pawl K, and provided with ratchet or count wheels, so that said pawl will only be operated after a certain number of impulses have been imparted to said levers N N', substantially as specified.

25. The combination of the scale-platform A with platform and track lapping levers N N', the scale-beam, the type-wheel, the impression-lever G, the pawl K, the ratchet-wheels P P', the levers $p^2\ p^2$, the connecting-link $p^3$, and the link $p^4$, substantially as specified.

26. The combination of the scale-platform A with the platform and track lapping levers N N', the scale-beam, the type-wheel, the impression-lever G, the pawl K, the ratchet-wheels P P', the levers $p^2\ p^2$, the connecting-link $p^3$, the links $p^4$, and the cam-wheels $p'$, substantially as specified.

27. The combination of the scale-platform A with the platform and track lapping levers N N', the scale-beam, the type-wheel, the impression-lever G, the pawl K, the ratchet-wheels P P', the levers $p^2\ p^2$, the connecting-link $p^3$, the link $p^4$, the cam-wheels $p'$, the slides $n^{10}$, and the pawls $n^{11}$, substantially as specified.

28. The combination of the slides $n^{10}$, having pawls $n^{11}$, the ratchet-wheels P P', cam-wheels $p'$, levers $p^2$, link $p^3$, pawl K, connected to said link $p^3$, impression-lever G, and type-wheel C, connected with and actuated by the scale, substantially as specified.

29. The combination of the slides $n^{10}$, having pawls $n^{11}$, the ratchet-wheels P P', cam-wheels $p'$, levers $p^2$, link $p^3$, pawl K, connected to said link $p^3$, impression-lever G, and type-wheel C, connected with and actuated by the scale, and levers N N' on the scale-platform and connected with said slides $n^{10}$, substantially as specified.

30. The combination of the slides $n^{10}$, having pawls $n^{11}$, the ratchet-wheels P P', cam-wheels $p'$, levers $p^2$, link $p^3$, pawl K, connected to said link $p^3$, impression-lever G, type-wheel C, connected with and actuated by the scale, levers N N' on the scale-platform and connected with said slides $n^{10}$, lever G' on the scale-platform, near the middle thereof, and connecting mechanism whereby the same operates to raise the impression-lever, substantially as specified.

31. The combination of the slides $n^{10}$, having pawls $n^{11}$, the ratchet-wheels P P', cam-wheels $p'$, levers $p^2$, link $p^3$, pawl K, connected to said link $p^3$, impression-lever G, type-wheel C, connected and actuated by the scale, levers N N' on the scale-platform and connected with said slides $n^{10}$, lever G' on the scale-platform, near the middle thereof, and connecting mechanism whereby the same operates to raise the impression-lever, and a pawl-lever regulating the feed of the paper and operated by said impression-lever, and the paper-strip-feeding guiding spools and pulleys, substantially as specified.

32. The combination, with a scale-platform, of the levers N N' and G thereon, ratchet or count wheels P P', pawl K, impression-lever G, and mechanism, substantially as described, connecting said parts, substantially as specified.

33. In an automatic car-scale, the combination, with a scale-platform having track-rails thereon, of a device at each end of the scale-platform adjacent to the track-rail adapted to be operated by the passage of the car-wheels, and an impression-lever connected and operated by one or the other of said car-wheel-actuated levers, according as the car is a long or a short one, substantially as specified.

EDWARD H. AMET.

Witnesses:
H. M. MUNDAY,
EDMUND ADCOCK.